US012342973B2

(12) United States Patent
Abdalla

(10) Patent No.: US 12,342,973 B2
(45) Date of Patent: Jul. 1, 2025

(54) AUTOMATIC TOUCHLESS (BUILDING AND WINDOW) WASH MACHINE

(71) Applicant: Abdalsalam Mohammed Abdalla, Sulaymaniyah (IQ)

(72) Inventor: Abdalsalam Mohammed Abdalla, Sulaymaniyah (IQ)

( * ) Notice: Subject to any disclaimer, the term of this patent is extended or adjusted under 35 U.S.C. 154(b) by 366 days.

(21) Appl. No.: 17/708,262

(22) Filed: Mar. 30, 2022

(65) Prior Publication Data

US 2023/0309765 A1 Oct. 5, 2023

(51) Int. Cl.

| | |
|---|---|
| ***A47L 1/02*** | (2006.01) |
| ***B08B 1/16*** | (2024.01) |
| ***B08B 1/30*** | (2024.01) |
| ***B08B 3/02*** | (2006.01) |
| ***B08B 3/08*** | (2006.01) |
| ***B08B 13/00*** | (2006.01) |

(52) U.S. Cl.

CPC ................ *A47L 1/02* (2013.01); *B08B 1/165* (2024.01); *B08B 1/30* (2024.01); *B08B 3/024* (2013.01); *B08B 3/08* (2013.01); *B08B 13/00* (2013.01)

(58) Field of Classification Search

CPC ........... B08B 3/024; B08B 1/30; B08B 1/165; B08B 3/08; B08B 13/00; A47L 1/02

See application file for complete search history.

(56) References Cited

U.S. PATENT DOCUMENTS

2007/0044259 A1* 3/2007 White, Jr. ................ A47L 1/02 15/103

2020/0360952 A1* 11/2020 Madsen ................ B05B 13/005

* cited by examiner

*Primary Examiner* — Andrew A Horton

(74) *Attorney, Agent, or Firm* — Chen-Chi Lin

(57) ABSTRACT

An automatic touchless washing machine is used for washing and cleaning all various types of buildings and windows. The machine dispenses, by a spray arm, high pressure water, chemical liquid, or dry-air from various storage tanks to wash areas of exterior surfaces of a building or a window. A controller controls the machine to automatically perform a wash program, step by step, without using hands. The controller further controls one or more wash functions by coordinating movements of the spray arm.

23 Claims, 7 Drawing Sheets

FIG. 6. Block Diagram.

AUTOMATIC TOUCHLESS (BUILDING AND WINDOW) WASH MACHINE

BACKGROUND OF THE INVENTION

1—Field of Invention

An automatic touchless washing machine dispenses high pressure water, foam (chemical liquid) and dry-air or wiper to automatically wash, clean, and dry external surfaces or windows of a building, without using hands.

2—Description of Related Art

Until now, the cleaning processes are doing manually (by hand) or limited process for all kinds of (buildings and windows) all over the world. Often this cleaning process will be complicated and dangerous especially in high buildings. It may cause deteriorating health, fear, faint, falling down and dying. Weather instability or lock of time is reasons for delaying or not doing the process of cleaning a Building or a window. Also the cleaning process by hand (manually) is slow. It takes a long time to clean a high building. The cleaning process by hand (manually) cannot be the same and may be making difference in cleaning on the surfaces of a building or windows.

Because of the difficulty and inertia of the cleaning process by hand (manually) or the lock of the time and sensitivity of the place, the high building or windows may be cleaned only once or several times annually but by this new invention an automatic touchless (building and window) washing machine have been solved these problems completely.

BRIEF SUMMARY OF THE INVENTION

The washing machine of the present disclosure contains a carriage or carriages installed on a guide railway or parallel guide railways firmly attached on the surface wash areas of a building or a window (vertically, horizontally and rotationally around the building) as required. It is used for automatic washing, cleaning and drying, very quickly.

DETAILED DESCRIPTION OF THE INVENTION

Figure 1:
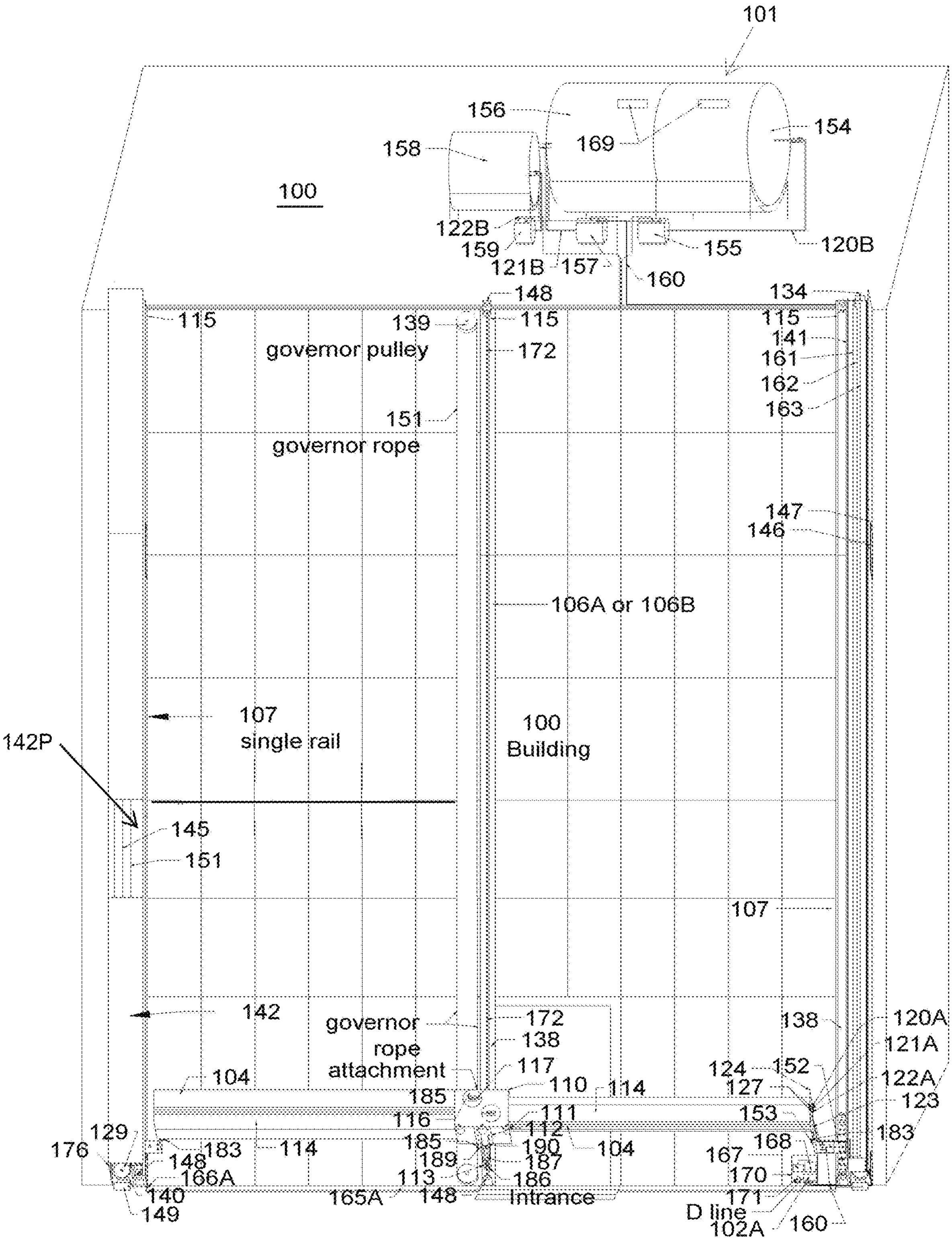
FIG. 1. Automatic touchless building washing machine.
Figure 2:
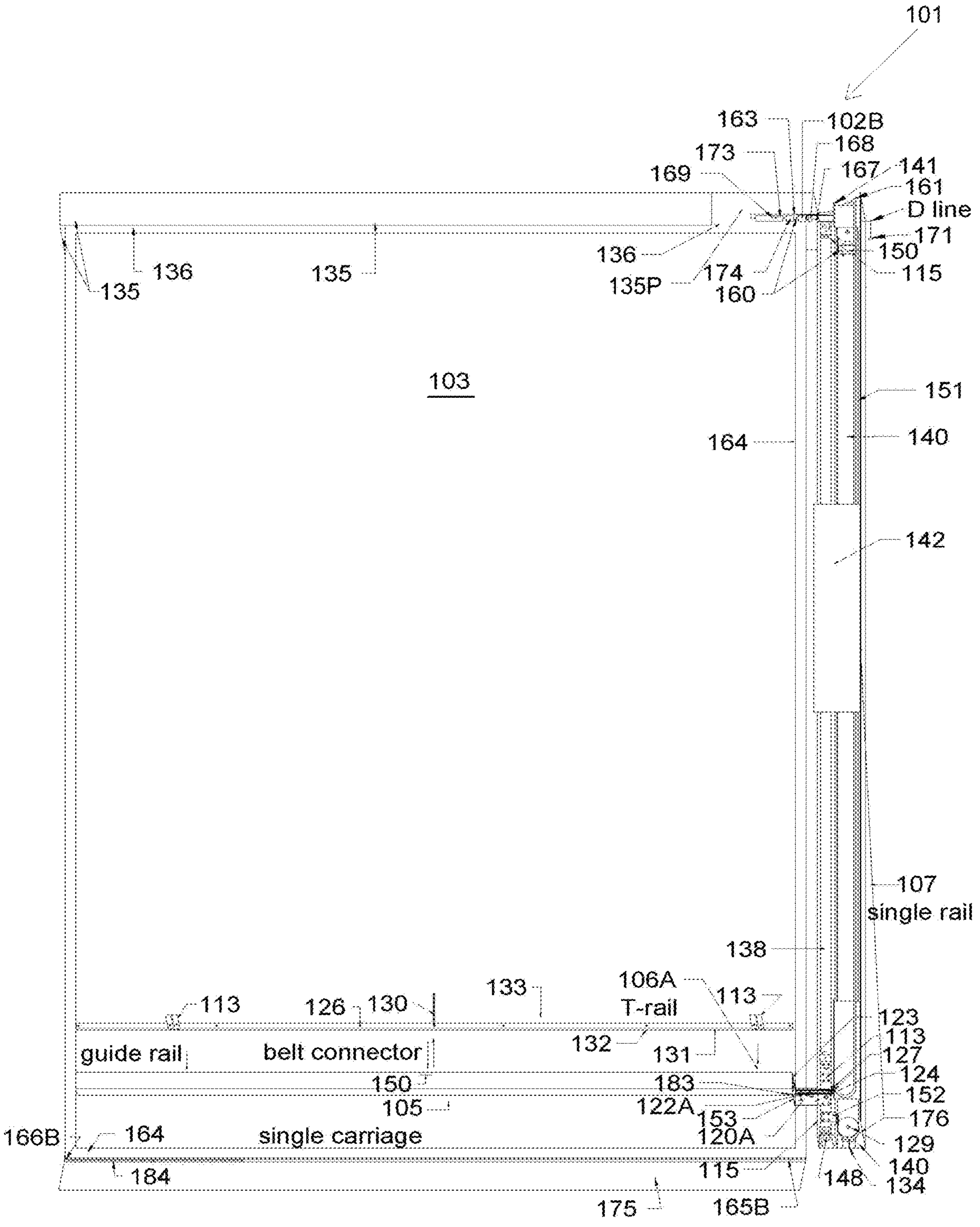
FIG. 2. Automatic touchless window washing machine.
Figure 3A:
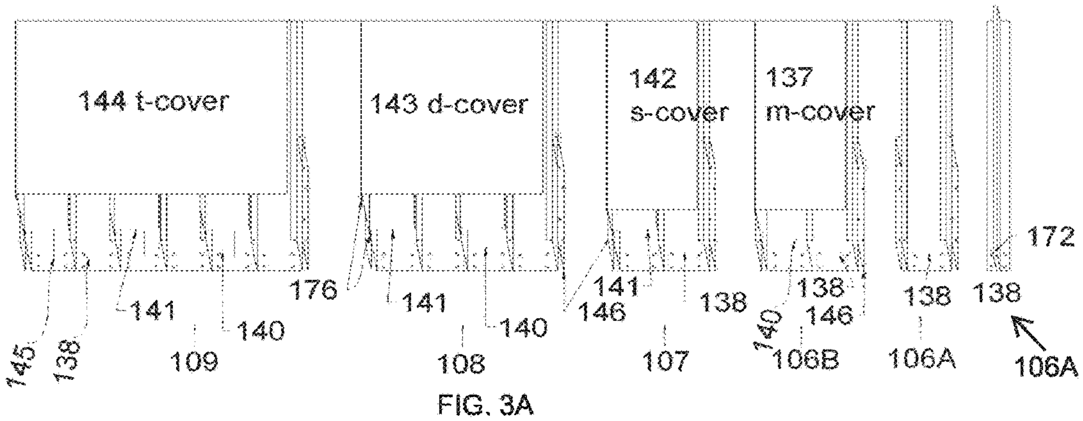
FIGS. 3A and 3B show different views of different types of guide rail design for automatic touchless (building and window) washing machine.

The present automatic touchless (building and window) washing machine (101) is a new invention. The automatic touchless (building and window) washing machine (101) includes a spray arm (114) which is fixed on a carriage, for example, a slide carriage (104) or a single carriage (105) capable of moving relatively on the guide rails, for example, middle rail (106A of FIG. 3) is a single-rail rail for not containing a belt position column 140, and middle rails (106A) that are firmly attached to the surfaces of a building or a window while the spray arm (114) dispensing various fluids in a programmed method. In general, carriage movement includes three degrees of motion according to patterns of rails: vertical carriage motion from vertical rails; horizontal carriage motion from horizontal rails; and circling carriage motion from rails surrounding a building. This invention can be described as follows: A. The automatic touchless (building and window) washing machine (101) may be used for different types of buildings (100) or windows (103). The automatic touchless (building and window) washing machine (101) is used for washing and cleaning the buildings and windows automatically without using hands, as illustrated in FIG. 1 and FIG. 2. B. The spray arm (114) comprises three various types of metal or plastic pipes.

Automatic Touchless (Building and window) Wash Machine (101), is an automatic type operationally on the surface's wash area of a building (100), wherein the carriages such as the Slide Carriages (104) is essentially arranged with respect to vertical moveable from top to bottom or vice versa on the parallel single rails (107) and middle rails (106A), in short the carriage movement is arranged according to installing railways direction including (vertical movement, horizontal movement and rotationally movement around the surface of a building or windows). Vertical movement as illustrated in FIG. 1.

Railways such as single railways (107) and middle railways (106A) consisting of spaced-apart parallel, and vertically, horizontally and rotationally installed and extended guide rails as required. As illustrated in FIG. 1.

Carriages such as slide carriages (104) and single carriages (105) are installed on the parallel railways such as (107) and (106A) orthogonal on rails, allowing vertically or horizontally movement along the railways during various phases of operation. As illustrated in FIG. 1, and FIG. 2.

Figure 6:
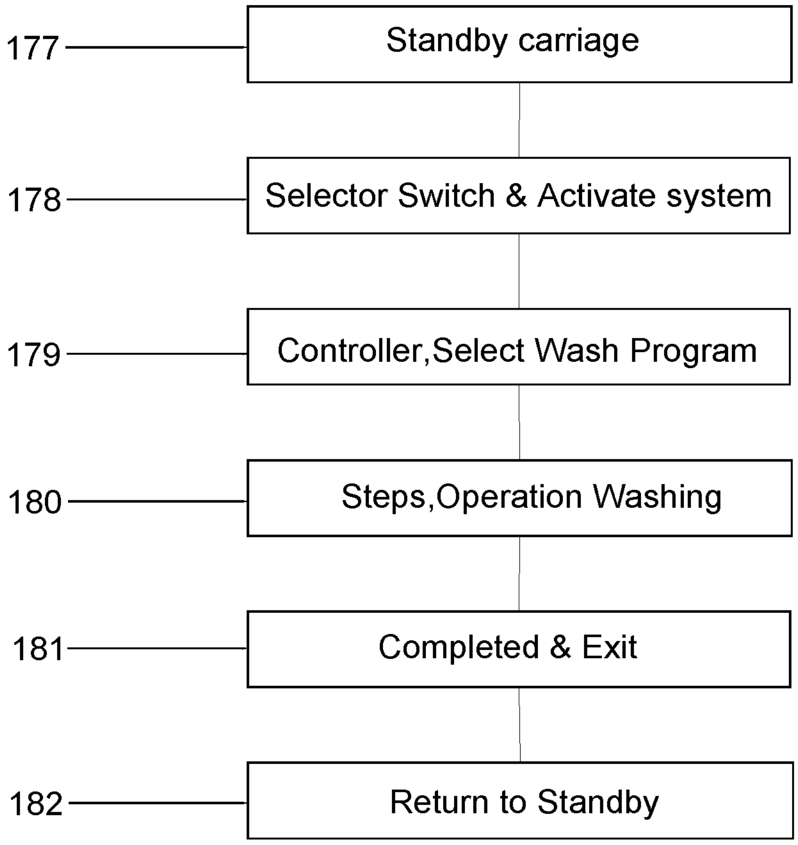
FIG. 6. Block diagram for Automatic Touchless Operation Washing Steps for Buildings and Windows.

As used herein, the term "automatic touchless (building and window) washing machine" (101) is used [to] for internal and external buildings and windows, including highest, lowest, biggest or smallest buildings and windows. The term "building wash operation steps", for example, see block (180), FIG. 6, is used for cleaning a building or a window. A simple wash sequence or a complex wash sequence may be manually or automatically selected by a selector switch and activation system (171).

Figure 4A:
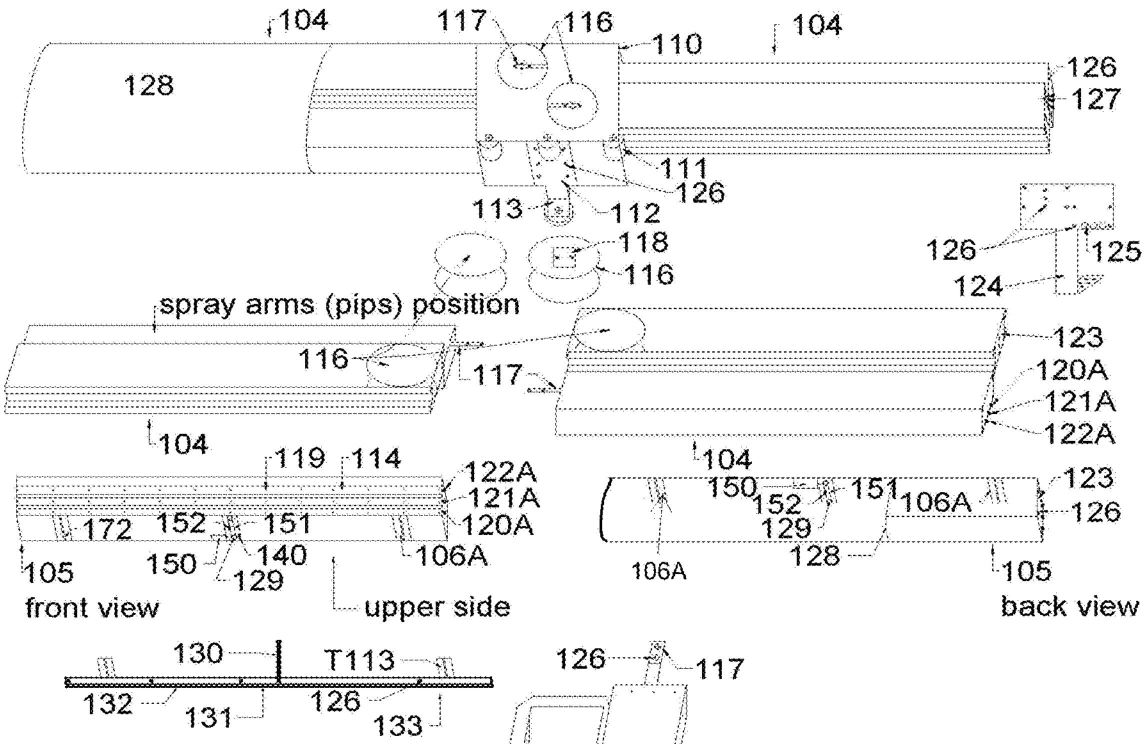
FIGS. 4A and 4B show different views of a carriage and a spray arm for automatic touchless (building and window) washing machine.
Figure 4B:
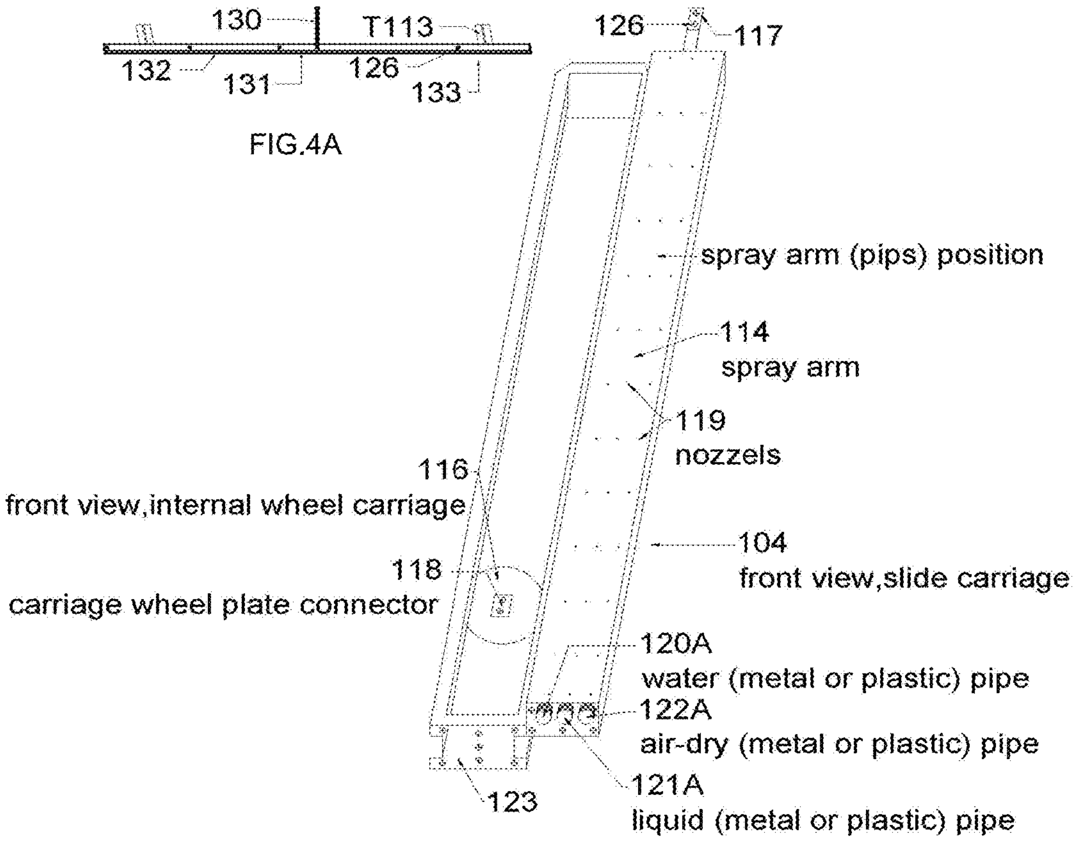

The spray arm (114) is consists three metal or plastic pipes as (120A, 121A, 122A) fixed in carriages such as a slide carriage (104) and a single carriage (105), also can be adding a wiper (133) to single carriages (105) and screwed a wiper (133) on the single carriage (105) especially using for wiping the internal windows as required. As illustrated in FIG. 2 and FIG. 4.

According to this invention, spray arm (114) consists of three pipes (120A, 121A, 122A) for dispensing various fluids including water, foam and high pressure dry-air. Carriages move vertically from top to bottom or vice versa on the external surfaces of a building including walls and windows, or using for internal building such as windows, at this time can be added a wiper (133) for a single carriage (105), including (wash and wipe), while providing fluids to the carriage pipes. As illustrated in FIG. 1, FIG. 2, and FIG. 4.

The Automatic Touchless Window Wash Machine (101) is used only for windows, can be extract fluids and air-dry from two sources:

A. Main storage fluid tanks (154,156,158) installing on the very top floor roof or put on/under the ground level. As illustrated in FIG. 1.

B. Secondary small storage Tank (173) mounted in the metal or plastic parking trench (136).

As illustrated in FIG. 2.

In this invention, the automatic touchless (building and window) washing machine (101) can also be used for internal building, can be installed with a wiper (133) or the high pressure air-dry metal pipe (122A), or both of them can be used in the same carriage (105). The wiper (133) is connected and adjustable with a single carriage (105) by screw timing (130) and belt connector (152). As illustrated in FIG. 2.

Wiper (133) is working automatically with helping limit switch used to performing wiping window's surface wash area after dispensing water and/or liquids for washing steps, the Wiper (133) which attached with upper side of a single carriage (105) may be moved automatically upward and toward the window's surface wash area by installing various small motor driven wiper operator (150) mounted on top of the middle single carriage (105), it is programmable by the controller and using sensor. As illustrated in FIG. 2 and FIG. 4.

Automatic touchless (building and window) washing machine (101) is used for internal and external windows (103) in a building but for internal windows can be adding wiper (133) instead of air-dry high pressure (122A) and it is adjusting and connecting by adjustable screws wiper (130) with the various belt connector (152). As illustrated in FIG. 2.

A Wiper (133) attached with two or more various small Slide Guides (T113) as required, to connecting with the upper side of a single carriage (105) by the support small middle T-Rails (106A) on it. As illustrated in FIG. 2 and FIG. 4.

The single carriages (105) have two small belt pulley (129), one of them connected to the small motor driven wiper operator (150) on the top at a middle single carriage (105) and the other fixed at the middle down side of a carriage (105), the traction wiper (133) has belt or steel cable (151), the ropes or belt (151) extend over both of upper driven pulley and down pulley generally located in the upper side of the middle single carriage (105).

As illustrated in FIG. 2 and FIG. 4.

Referring now to FIGS. 1, 2, and 6, the controllers, for example (102A) or (102B), send and receive signals to input and output devices including switches, carriages, electrical devices of the (storage tanks and drive units) and sensors, to control and operate carriage movement and to provide high pressure spray water, fluid, and dry-air to preform the wash program steps on a building or a window. The spray arm (114) retrieves fluids from tanks, for example (154, 156, 158, and 173).

Carriages such as slide carriages (104) and single carriages (105) are supported by a spray arm (114) consists of (water, fluid-dispensing and air-dry) nozzles (119). The spray arm (114) is caused to move from top to bottom of surfaces of a building's wash area (100) or a window's wash area (103) or vice versa while performing one or more wash functions as required. As illustrated in FIG. 1, FIG. 2 and FIG. 4.

According to (building's or window's) surface's dimensions such as (height, width and length) are installed guide railways and carriages as required to control surface wash area, carriage movement such as a vertical movement from top to bottom or vice versa, horizontal movement from right to left or vice versa or rotational movement depending on railways-attached pattern on the surfaces of a building or a window, All acting under the direction of a controller like as main controller (102A) and sub-controller (102B).

As illustrated in FIG. 1 and FIG. 2.

A spray arm (114) in such a way as to maintain a desired and required distance from the surface's wash area. Automatic touchless (building and window) washing machine (101) can be using for all various types of external and internal (a window's or a building's) surface wash area forms such as (concave, convex, slant surface, angle, exterior ceiling panels and/or any other building's surface point or window's surface point where can be attached railways). As illustrated in FIG. 1 and FIG. 2.

Each carriage such as a slide carriage (104) or a single carriage (105) have various lengths depend on their material between (0.1 m-6 m) long or more than, but a slide carriage (104) can be connected with another by connecting the end carriage plate connector (117) with the carriage wheel plate connector (118) which is fixed on the front internal wheel carriage (116) after that both of carriages are installed into a middle slide carriage connector (110) and the Middle slide carriage connector (110) is fixed on the wheel set (113) via support L-plate connector (112) and installed on the middle rails (106A) to make a longer carriage as required and traveled on them, the Carriage has a small weight, which means a small loading there to traction Carriage.

As illustrated in FIG. 1, FIG. 2 and FIG. 4.

Figure 5:
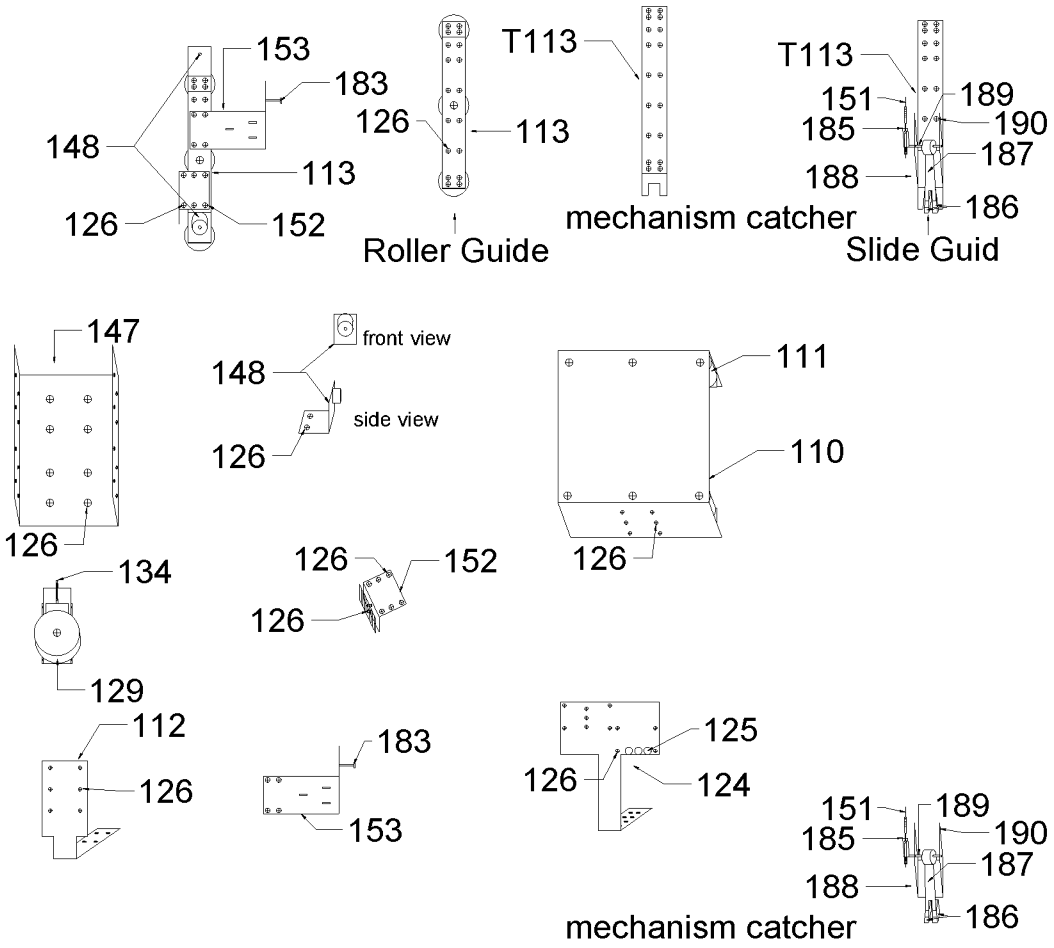
FIG. 5. Auxiliary parts for connecting all devices of the automatic touchless (building and window) washing machine.

As shown all accessories and auxiliaries of the touchless (building and window) washing machine (101) to connecting all instruments in the system and can be changing and replacement each one if required for performing those purpose. As illustrated in FIG. 5.

In an automatic touchless (building and window) washing machine (101), a single carriage (105) is used in the system when the wide of the surface wash area of a building or a window smaller than or equal to the standards of one single carriage's length (105). As shown in FIG. 2 and FIG. 4.

Detailed drawing of the carriages such as slide carriage (104), single carriage (105) and spray arm structure (114) to clarify their components. As shown in FIG. 4.

Spray arm structure (114) with parts to show how fluid are dispensed to the surfaces of the building or window. As illustrated in FIG. 1, FIG. 2 and FIG. 4.

A slide carriage (104) and a single carriage (105) has a spray arm (114), which is holding independent relationship thereto three spray (metal or plastic) pipes (120A, 121A, 122A) are arranged in it. As illustrated in FIG. 4.

A slide carriage (104) and a single carriage (105) may be decorating and lighting (128) by plastic cover or any materials as desired to provide an esthetically pleasing appearance.

As illustrated in FIG. 4.

The Guide Railways such as Single rails (107) and Middle rails (106A) may be decorating and lighting (128) by plastic cover or any materials as desired to provide an esthetically pleasing appearance.

Various flexible hoses or flexible pipes such as flexible water hose (163), flexible liquid (chemical) hose (162) and flexible hose air-dry (161) are gathered together and laid on the special removable tray cables and pipes (141) and connected flexible pipes with their tray (141) until get to a middle point of the buildings height to avoid any distortion in the operation system while the carriage moves vertically along rails. As illustrated in FIG. 1.

Install the metal rails such as middle rails (106A, 106B), single rails (107), dual rails (108) and triple rails (109) or any other various types of rails as required to the measured height and always align vertically such as illustrated in FIG. 1, FIG. 2 and FIG. 3. But some time may be aligned horizontally or rotationally as desired and necessary.

Figure 7:
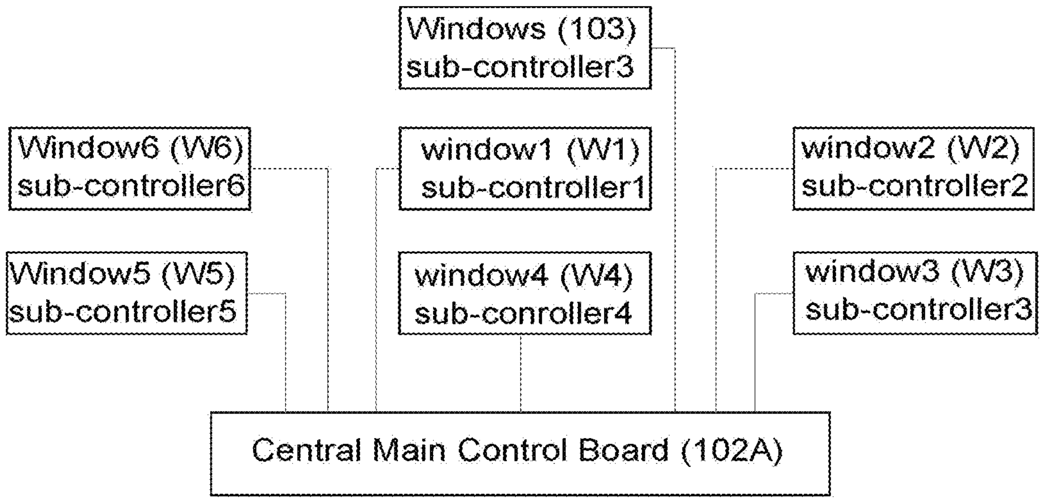
FIG. 7. Block diagram for central main control board for automatic touchless (building and window) washing machine.

In an automatic touchless (building and window) washing machine (101), the central main control board (102A) or/and secondary control board (102B) input and output cables or wires are connected to all electrical devices such as motors, sensors, selector switch, . . . etc. As illustrated in FIG. 1, FIG. 2 and FIG. 7.

Drive Units such as various types of motors (149) and (150) in automatic touchless (building and window) washing machine (101) used to operate the movement, speed, torque and high pressure (water, chemical and air-dry) of carriages such as slide carriages (104) or single carriage (105) and spray arm (114). As illustrated in FIG. 1 and FIG. 2.

An electrical power supply (168) is connected with the input main control board (102A) and input sub-control board (102B) to provide the D.C or A.C power to operate the programmable logic controller (PLC), and the power supply provides power to all other components, it provides power to the Input module, output module, memory system, and processor. As illustrated in FIG. 1 and FIG. 2.

Connect wires from the Selector Switch and Activates System (control unit) (171) to the input module PLC Main Controller (102A) and sub-controller (102B). As shown in FIG. 1 and FIG. 2.

A special waterproof board may be provided and be installed in the trench on the surfaces of the wall, put in the building's ground level or on the top of the last building's roof for the purpose of burying and decorating the automatic touchless (building and window) washing machine's (101) all devices like as motor, controller and other accessories. As illustrated in FIG. 1. Instruments such as; Small Storage Tank (173), water pump (174), sub-control board (102B), small motor gearbox (150) and other accessories can be fixed inside the parking trench (136) and belt position (140). As illustrated in FIG. 2.

Connect the cables or wires to power source (168), and power on/off switch (167).

As illustrated in FIG. 1 and FIG. 2.

Adjust the parameters on the main controller (102A) and sub-controller (102B) if needed, such as (the carriage traveling speed and delay time . . . etc). As illustrated in FIG. 1 and FIG. 2.

Loosen the adjustable screw (183) on adjustable L-carriage connector plate (153), which is fixing on the wheel set (113). As illustrated in FIG. 1 and FIG. 5.

Side plate carriage connector (124) is fastening with screws on the Fix side plate carriage (123) for both carriages such as the slide carriages (104) and the single carriages (105).

As illustrated in FIG. 1, FIG. 2, FIG. 4 and FIG. 5.

After installed wheel set (113) into the guide rails (138) such as in the single railways (107) and the middle railways (106A), the upper ends of the side plate carriage connector (124) is connected with Fix side plate carriage (123) at the ends of Carriages such as a slide carriage (104) or a single carriage (105) and the other ends of Side plate carriage connector (124) is attached with Adjust carriage connector plate (153) which is connected on the wheel set (113).

As illustrated in FIG. 1, FIG. 2, FIG. 4 and FIG. 5.

Adjust the tension of the Slide Carriage (104) or Single Carriage (105) by using the Adjustable Screw (183) for both sides (right and left) of a carriage.

As illustrated in FIG. 1 and FIG. 2.

Installed a slide carriage (104) or a single carriage (105) onto the guide rails (138) via various wheel sets (113) such as in single railways (107) and middle railways (106A) as required according to the width and the height of the surface wash area of buildings or windows and make sure the wheel sets (113) are fully resting into the railways (138).

As illustrated in FIG. 1 and FIG. 2.

Make sure the slide carriages (104) and the single carriage (105) and spray arm (114) are horizontally aligned and the gap between the spray arm (114) and the vertical building's surface (100) or the vertical window's surface (103) are parallel as needed. If they are not aligned, it can be adjusted by the screwing (183) or changing the height by using the various types of side plate carriage connector (124). As illustrated in FIG. 1, FIG. 2 and FIG. 5.

A Slide carriage (104) is used for a Building or a Window, when the width of a surface wash area greater than the standard length of a carriage, to get the possible and required length can be used two or more slide carriages (104). As illustrated in FIG. 1.

A slide carriage (104) is connected with the another Slide Carriage (104) as required according to the dimensions of a building's surface wash area such as Building (100), upper ends of the Support L-Plate Connector (112) is attached on the external side of auxiliary Middle Slide Carriage Connector (110), and the other ends of L-plate connector (112) is attached on the Roller Guide or Wheel Set (113) which is installed on the guide railway (138) in Guide Middle Railways (106A). As illustrated in FIG. 1 and FIG. 4.

While a Building or a Window has a different dimensions of the surface wash area such as upper width is 6 m and down width is 12 m, at this time must be using two Slide Carriages (104) or more and they are connecting together through a special Middle Slide Carriage Connector (110), means that when the Slide Carriages (104) move downward or upward can changes their length according to change width of the building's surface, by Middle Slide Carriage Connector (110) with internal support Carriage Connector Wheel (111). As illustrated in FIG. 1 and FIG. 4.

Spray Arm (114) consisted of three various metal or plastic pipes such as (water pipe (120A), chemical liquid (foam) pipe (121A) and air-dry pipe (122A)), the Spray arm (114) is installed into a Carriage such as a slide carriage (104) or a single carriage (105).

As illustrated in FIG. 4.

The flexible hose pipes such as flexible water hose (163), flexible liquid hose (162) and flexible hose air-dry (161) are connected by screw joint metal pipe (127) between the Spray Arm's (114) metal or plastic pipes such as [(120A), (121A) and (122A)] on the carriage and various Storage Tank's metal pipes like as [(120B), (121B) and (122B)] such as water storage tank (154), liquid storage (156), liquid small storage (173) and air-dry compressor (158), the flexible hoses are aligning and fixing on the Rail's Tray cables and pipes (141). As illustrated in FIG. 1 and FIG. 2.

The Stopper (148) is designed to cushion the stop of descending carriages such as a slide carriage (104) or a single carriage (105) beyond its normal limit of travel.

As illustrated in FIG. 1 and FIG. 2.

Installing the Stopper (148) on the upper ends and down ends of the Wheel Sets (113) such as Roller guide and Slide guide. As illustrated in FIG. 5.

Installing the Stopper Plate (148) into both ends the upper ends and down ends of the Rails such as the single rails (107) and the middle rails (106A). As illustrated in FIG. 1 and FIG. 2.

The traction carriages have a belt or a steel cable called wire ropes (151) for no set limit height, attached to the middle of the carriage, the both ends of the carriage or only one end of the carriage by using the belt connector (152), the wire ropes (151) extend over pulleys (129) generally located at both ends inside the belt position column (140), a big attraction motor (149) is installed for a big surface wash area like as a Building (100) as required. As illustrated in FIG. 1. A portion 142P of the cover 142 is shown in a broken view so as to show the wire ropes (151).

Adjust the tension of the belt or steel wire rope (151) by adjusting the big attraction motor (149) and the upper belt pulley by adjustable belt tension (134), and fixed them on their places. As illustrated in FIG. 1.

The traction carriages have a belt or a steel cable called wire ropes (151), attached to the middle of the carriages, the both ends of the carriages or only one end of a carriage by using the belt connector (152), the wire rope (151) extend over pulleys (129) generally located of both ends in the belt position (140) for the Window (103) and installed a small attraction motor (150) as required. As illustrated in FIG. 2.

Adjust the tension of the belt or steel wire rope (151) by adjusting the small attraction motor (150 and down belt pulley (129) by adjustable belt tension (134), and fixed them on their places. As illustrated in FIG. 2.

Mechanism catcher (188) includes a rod (189) which is fixed in the plate connector (190), at the external one end of the rod (189) is a drive arm (185) that is used to connect both ends of the governor rope (151), safety levers (187) is connected to middle rod (189), and the other ends of the safety levers (187) are connected to a catcher (186). As illustrated in FIG. 5.

A Mechanism Catcher (188) is connected on the upper end or down end of the wheel set (slide guide) (T113) as required. As illustrated in FIG. 5.

The Limit Speed Governor (139) installed inside top end of the Belt Position (140) and connected with the Pulley (129) which is attached on the other ends of the Belt Position (140) by the Governor Rope (151) coupled with the Middle T-Rails (106B), both ends of the Governor Rope (151) are attached to the Drive Arm (185) on the Mechanism Catcher (188) which is connected on the one ends of the Slide Guide (T113) in the center or one end of the Slide Carriages (104) to stop if required especially in high Buildings in the event that the Carriage starts traveling beyond an acceptable speed, require a Limit Speed Governor (139) to help control speed at emergency state. As illustrated in FIG. 1 and FIG. 5.

Both ends of the governor rope (151) are attached to the drive arm (185) which is installed on the external end rod (189) of the safety mechanism, from above, it goes around the governor or speed limiter pulley (139) extend to the down fixed pulley, when driving the slide carriage (104) carry with it the governor rope (151). The governor rope (151) and the slide carriage (104) move in the same way. When the carriage moves at a speed higher than the allowable speed and if the carriage move down, it will catch on the stops in the body, and the pulley will stop, so that the rope does not slip when the pulley stops and can lift the safety levers (187) which is attached on the middle rod (189). The mechanism catcher (188) is connected to the upper end or down end of the wheel set (slide guide) (T113) on the middle T-rails (106B), when the activated speed limiter (139) stops the rope (151). The slide carriages (104) will continue to move downward turn the drive arm (185) and the catcher (186) on the slide guide (T113) will be triggered and firmly clamp the middle T-Rail guides (106B) holding the slide carriages (104) on them. The limit switch (115) will open the carriage safety electrical circuit and the main drive motor (149) will stop. As illustrated in FIG. 1 and FIG. 5.

After installing wheel set (113) as Roller guide or Slide guide on the rails then mounted the belt connector (152) on it. As illustrated in FIG. 1 and FIG. 2.

Guide Rails like as single railways (107) and middle railways (106A) are firmly attached to the surface's wash area of a building or a window with clips bolted to various types of rail Brackets (147), after measuring the building surface's dimensions or windows surface's dimensions such as (width, height and length), Rails are aligning vertically or horizontally as required. As illustrated in FIG. 1 and FIG. 2.

Middle railways such as (106A) and (106B) are used like as auxiliary and installed a speed governors on middle T-rails (106B) in high buildings for controls the speed if the carriage runs more than the speed limit. As illustrated in FIG. 1 and FIG. 3.

Classify the Rails into; Middle Railways (106A), (106B), Single railway (107), Dual railway (108), Triple railway (109) or any other possible Rails can be using and installing them according to surface's dimensions of the buildings or the windows such as (height, width and length).

As illustrated in FIG. 3.

The Channel Collector (165A) is using to gathering extra water, it is attached with the down flange of the Building's Surface's washing Area (100), the Channel Collector (165A) is using for the purpose of collecting water while performing the operation washing steps and discharging the water through in the slope level Channel Collector (165A) by installing a hide flexible conduit (166A). As illustrated in FIG. 1.

The metal or plastic Channel Collector (165B) is using to gathering extra water and it is fastened with the down flange of the Windows Frame (164) and based on the Window's Sill (175), the Channel Collector (165B) is using for the purpose of collecting water while performing the operation washing steps and discharging the water through in the slope level Channel Collector (165B) by installing a hide flexible conduit (166B). As illustrated in FIG. 2.

Can be using and installing the Under Storage Tank (184) for collecting extra liquid when performing operation washing steps particularly in the internal surface's wash area of buildings and windows. As illustrated in FIG. 2.

A small storage water tank (173) is fixed to the parking trench (136) which is attached to the top of the window's frame (164). As illustrated in FIG. 2.

The small storage water tank (173) may be refilled by two ways. For a direct method, a small storage water tank (173) is connected to the top main storage water tank (154) by a flexible conduit (163) or is connected to a liquid storage tank (156) by a flexible conduit (162). The water level (169) is shown in FIG. 1 and FIG. 2. For a manual method the small storage tank (173) may be refilled by manual (hand) at any time as needed. As illustrated in FIG. 2, a portion 135P of the cover 135 is shown in a broken view so as to show the flexible conduit (163), the small storage tank (173), the water pump (174), the sub-control board (102B), and the power on/off switch (157).

The base guide railways (138) is fitting to the various wheel set devices (113), that is cause to prevent sway the wheel set (113) in the base railway (138).

As illustrated in FIG. 1 and FIG. 2.

To achieve safe movement without swinging, straight and distortion-free various guide rails are required. As illustrated in FIG. 3.

Figure 3B:
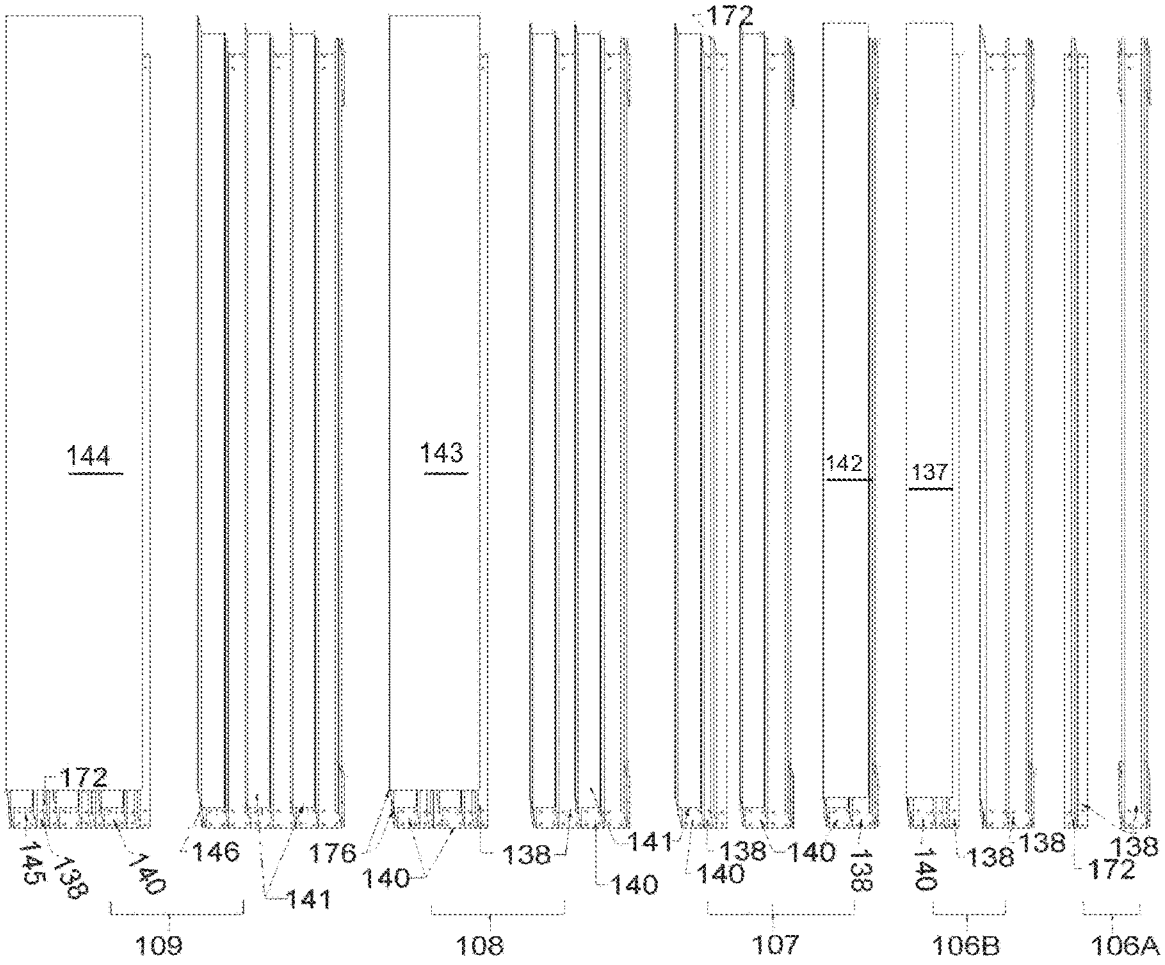

A guide rail such as a single rail (107) or a middle rail (106A) is connected to another rail so as to form long rails for the high building through a rail connector (147) and a balance bracket connector (146), as needs. The length of railways is variable according to variable dimensions of a surface's wash area of a building or a window. As illustrated in FIG. 1, FIGS. 3A and 3B, and FIG. 5. A belt separator column plate (145) is shown in FIG. 3B. A T-rail male (172) is shown in both FIGS. 3A and 3B.

All various types of Guide Rails such as Single Railways (107), Middle Railways (106A) or other various types (T-rails or omega rails) are firmly attached to the wall or the building's surface wash area (100) or Window's surface wash area (103) with Clips bolted to deferent types of rail bracket (147) which are used as required. As illustrated in FIG. 1, FIG. 2 and FIG. 3.

The various Carriages such as a single carriage (105) and a Slide Carriage (104) or spray arm (114) is swing if the Railway joints are not smoothly connected and each railway must be perfectly straight, any distortions or straightness of the rails must be checked and corrected to make the Carriage movement smooth. As illustrated in FIG. 1.

The groove for the railways joint is created and holes are made for inserting the bolts. As illustrated in FIG. 1.

While making long rails for the high building can be making holder balance bracket (146) for both end sides (left and right) of a railway, to achieve smooth and straight guide rails at joints. As illustrated in FIG. 1 and FIG. 3.

An automatic touchless (building and window) washing machine (101) is supplying water, foam (chemical liquid) and high pressure air-dry to the spray arm (114) for washing surfaces of a building or windows step by step from water storage (154), chemical mixing storage (156), air-dryer compressor (158), and small hanger storage (173), all storage tanks generally are installed on the last floor roof, put on/under the ground level or hanging inside parking trench (136) on the top of window's frame. As illustrated in FIG. 1 and FIG. 2.

A central main control board (102A) (PLC, switch gear, and control panel 170) and sub controller (102B) are connected to an electrical power supply source (168), the power supply source provides power to all other components to operates. It provides power to the input/output modules, memory system and processor, sub-controllers (102B) (PLC, switch, control panel) can be connected with the central main control board (102A). Both of them are used to control, operate, activate, or deactivate output application devices to control wash program step by step and movement of the carriage. Those steps or programs are saved in memory and retrieved them from it to carry out moving the carriage, washing, rinsing and air-dry high pressure program by the carriage automatically or by manual. As illustrated in FIG. 1 and FIG. 2.

The input device provides such as a selector switch (171) is sending a signal to an input module, this input module is connected with the CPU for the initial automated processes, CPU process all the input data, after processing by CPU, it gives output data to the output module, the output module provides a signal to the output devices. As illustrated in FIG. 1 and FIG. 2.

The slide carriage (104) and the single carriage (105) movements are performed under the control program resident in memory in a Central Main controller (102A) and Sub Controller (102B), the controllers are receiving input signals from the selector switch (control unit) (171) by the line (D), thereafter they are controlling and sending these signals to the various types of the output electrical devices such as; electrical motor gearbox (149), (150), electrical motors of the storage tanks such as (water storage motor (155), chemical storage (foam) motor (157), air-dry compressor (159), Small water or fluid pump (174) and decorating frame lights . . . etc).

As illustrated in FIG. 1, FIG. 2 and FIG. 6.

A Controller such as a Central Main Controller (102A) and a sub Controller (102B) each on can be sent and received signals by the way of cable lines such as (D) lines and bus lines (160) to the various electrical devices of selector switch (171), various drive units (motors) and storage tanks where fixing on the last roof or in the parking trench (136) to perform wash program step by step perfectly, those steps or programs are saved in memory and retrieved them from it to carry out traveling carriage, washing and rinsing program.

As illustrated in FIG. 1, FIG. 2, FIG. 6 and FIG. 7.

Electrical devices (155), (157), (158) receive signals from the main controller (102A) by output line (160) to get switch on or switch off automatically or selected by manual, can choose options by selector switch (171). As illustrated in FIG. 1.

The central main control board (102A) and sub control board (102B) are progress to perform wash program step by step automatically and to finding the top and bottom ends of parallel rails, by setting program in controllers or by installing the sensors or limit switches (115) on the rails in possible position according to the designing of automatic touchless (building and window) washing machine (101). As illustrated in FIG. 1 and FIG. 2.

The various sensors (115) and the Controllers such as Central Main Control Board (102A) and Sub Control Board (102B) are provided information to determine the height of the vertical travel of the slide carriage (104) and the single carriage (105) during the steps of washing, rinsing and air-drying operation thereby to avoid wasteful motion and over travel of the carriages such as a Slide Carriage (104) and a Single Carriage (105).

As illustrated in FIG. 1, FIG. 2 and FIG. 6 block diagram.

The main control board (102A) and the sub-control boards (102B) are using for operating and controlling of the automatic touchless (building and window) washing machine (101) devices for different types of buildings and windows, such as a Building (100) and a Window (103). As illustrated in FIG. 1 and FIG. 2.

Cables or wires (160) are installed on the removable tray cables and pipes (141) coupled with single guide railways (107) which are attached along building's surface wash area. According to the installation of the guide railways to controls and supplies the electrical power signals and data signals to the automatic touchless (building and window) washing machine (101), to carry out the operation a building or a window wash system step by step exactly without any problems. As illustrated in FIG. 1 and FIG. 2.

Each carriage such as a slide carriage (104) and a single carriage (105) are connected with one or more drive wheel sets (113), which are installed inside one column of guide rails (138) or the parallel guide rails (138) as required, in all types of guide rails such as single railways (107) and middle railways (106A), the wheel set (113) stabilize inside the rails (38) and prevent sway wheel set (113), the carriage such as Slide Carriage (104) or Single Carriage (105) is runs on rails (138) and is guided by drive wheel sets (113) which is connected to belt or wire rope (151) by support belt connector (152), the traction wheel sets (113) has the belt or steel wire rope (151) inside the belt elevator position (140) is connected by the belt connecter (152) between two belt pulleys (129), one of them fixed on the Motor gearboxes such as motor gearbox (149) or (150) and the other one is fixed on the other ends of belt position (140), for buildings and windows, to create vertical motion along the railways. As illustrated in FIG. 1 and FIG. 2.

Various Electric motor gearbox such as a big Motor drive (149) and a small Motor drive (150) which are operatively connected with the gearbox and used for movement carriages such as slide carriages (104) and single carriage (105), The motors are reversible so that the carriages can be caused to travel in a programmed fashion and to a programmed degree in both forward and reverse vertically or horizontally directions along the guide railways such as single rails (107) and middle rails (106A). As illustrated in FIG. 1 and FIG. 2.

The main storage tanks such as water storage (154), chemical storage (156) and compressor Storage tank (158) are connecting with their motors as sequence such as (155), (157) and (159) by the upper (metal or plastic) pipes as sequence (120B), (121B) and (122B), thereafter the output of their motors are connected again with their metal pipes (120A), (121A) and (122A) called Spray Arm (114) inside the Carriages such as a Slide Carriage (104) and a Single Carriage (105) as sequence, to supplied the components such as (water, chemical liquid (foam) and air-dry) in the storage tanks to manifold Spray Arm (114) by Flexible Hose Pipes such as flexible water hose (163), flexible liquid hose pipes (162) and flexible air-dry pipes (161) fitting mounted in the removable tray cables and pipes (141) which are screwing with the railways (107) extending outwardly along railways, supplies the high pressure (water, foams and air-dry) to the nozzles (119). As illustrated in FIG. 1 and FIG. 2.

The slide carriage (104) and the single carriage (105) are carrying a spray arm (114) which is consist of three horizontal manifold metal pipes (120A, 121A, 122A), each one has a number of nozzles (119) attached to it as sequence along their length as which is equipped with a series of spaced-apart spray nozzles (119), they are orthogonal on the surface's wash area of a building or a window to direct washing, rinsing fluids and air-dry high pressure toward the surface's wash area. As illustrated in FIG. 1, FIG. 2 and FIG. 4.

Pattern of travel of slide carriages (104) after completed washing steps of a building's surface wash area, the Slide carriages (104) are parking (Standby Carriage) at the upper end of a building's surface's wash area or at the down end of a building's surface's wash area as required.
As illustrated in FIG. 1 and FIG. 6.

Pattern of travel of a Single Carriage (105) after completed washing steps of a Window's surface wash area, a Single carriage (105) is parking (Standby Carriage) in the parking trench (136) on the upper end of a Window's frame (164). As illustrated in FIG. 2 and FIG. 6, block diagram.

A Spray Arm Manifold (114) is consisted of three metal or plastic pipes such as (120A, 121A, 122A), each one being connected with several T-fitting to supply various components such as (water, foam and air-dry) to their nozzles (119). As illustrated in FIG. 1, FIG. 2 and FIG. 4.

A carriage or a spray arm (114) in automatic touchless (building and window) washing machine (101) in a "standby carriage" condition (177). As illustrated in FIG. 6, block diagram. In this state, no fluids are being dispensed when indicated options by changing the selector switch and activate system block (178), by the way of the line (160) is sending signals to the controller such as central main control board (102A) or sub control board (102B), the controllers are controlling and sending these signals to the various types of the output electrical devices as programmed such as; electrical motor gearbox (149) or (150), it cause to moving the carriages such as slide carriage (104) or single carriage (105) to exit the standby state block (177) and enter an activated state block (178), concurrently the controller block (179) is selected wash program and supplies the power to the various types electrical devices and started the operation washing and rinsing step by step represented by block (180) after performing these operation washing steps, the carriage is completed washing process and exiting this operation block (181) and the carriage return to standby state block (182). As Illustrated in FIG. 6, block diagram.

An Automatic Touchless (Building and Window) Wash Machine (101) progresses under the Main Controller (102A) or sub-Controller (102B) to standby carriages such as Slide Carriages (104) or Single Carriages (105) on their position or activating them for operation washing system step by step;

In this case, the operation wash system means that the carriages like as Slide Carriages (104) or Single Carriages (105) are moving from the standby position on the upper end of building's surface wash area (100) to the down end of building's surface wash area (100), or vice versa, and moving carriages from top to bottom on the window's surface wash area (103) or vice versa.

The operation wash system is carry out by activating the various types of motors under the Controller program such as (Various Storage Tank Motors and Various Drive Carriage Motors), the Various Storage Tank Motors such as small water pump (174), (water storage motor (155), chemical storage motor (157) and compressor Storage tank motor (159) are used for washing steps for high pressure dispensing various fluids and air-dry, but the Various Drive Carriage Motors such as a Various big motors (149) for the big surface's wash area or various small motor gearboxes (150) for a small surface's wash area, are used to travel the slide carriages (104) or single carriages (105) along the Guide Railways to the desired position such as single rails (107), and middle rails (106A) until the carriages come to stop, by installing sensors (115) such as limit switches, by an electric eye set comprise sender and receiver or any other possible sensors, on the upper end and the down end on the Guide Rails. As illustrated in FIG. 1 and FIG. 2.

As shown in Block Diagram in FIG. 6, selected switch and activated system block (178), when activated desired system, the Controller (179) is selected the wash program saved in previous in memory and sent signals to output devices to carry out washing and rinsing operation steps (180). As illustrated in FIG. 6.

An Automatic Touchless Building and Window wash Machine (101) under the Main Controller (102A) progresses to the wash program represented by block (179), in this program the Carriages such as a slide carriage (104) is moving for several times along vertical height surface's wash area of a Building or a Window during operation washing steps, which is comprising, presoak, chemical liquid (foam), high pressure washing and the end is used air-dry power full onto the building's surface wash area;

Each previous state being programmed and inserted in the controller (102A) for carry out washing and rinsing steps.

Nozzles are usually directed toward a building's surfaces wash area. As illustrated in FIG. 1, FIG. 2 and FIG. 6.

This new Invention (automatic touchless (building and window) washing machine (101)), is the best machine for operation washing and cleaning steps and the fastest for the highest and the biggest building and window in the world without using hands. As illustrated in FIG. 1 and FIG. 2.

In an automatic touchless building and window washing machine (101), power supply provides power to all other components to operates. It provides power to input modules, output modules, memory system and processor, the function of the power supply is to provide the DC or AC power to operate the PLC, the PLC work at 220 VAC or 24 VDC. As illustrated in FIG. 1 and FIG. 2.

Install selector switch or control unit (171) in any desirable position to perform operation of washing system, step by step, for washing a Building or a Window by the automatic touchless building and window washing machine (101). It can be performing at any time as needed. As illustrated in FIG. 1, FIG. 2 and FIG. 6.

A central main control board (102A) can be connected to all window's sub control boards (102B), (internal window's surface and external window's surface) such as (W1, W2, W3, W4, W5 and W6) in a building, for the purpose of controlling and performing the steps of operating washing program by the automatic touchless building and window washing machine (101) in the central main controller (102A). As illustrated in FIG. 7, block diagram.

This new Invention known as "automatic touchless building and window washing machine (101)" used for washing and cleaning steps automatically to various types of buildings and windows is the easiest and safe process for cleaning them with compare the conventional method to washing a building or a window by hand (scrubbing with wipes, sponges and brushes) actually the conventional methods are very difficult and dangerous process especially for high buildings is not pleasant often causes a terrible disasters. As illustrated in FIG. 1.

An automatic touchless building and window washing machine (101) is used to performing washing system step by step many times a day to the highest building in the world by best way without any risks by the automatic touchless building and window washing machine (101) while compare with conventional way (by hand), which is more complex process and it takes a long time to clean up a building only once (maybe takes several days or weeks). As illustrated in FIG. 1.

All locations of the surface's wash area of a building can be cleaning well by this modern system "automatic touchless building and window washing machine (101)" which will help protect the Building always decorating and looking good, while compare with the conventional way (washing by hand) not all locations can be cleaned well, especially for high buildings. As illustrated in FIG. 1.

An automatic touchless building and window washing machine (101) with their accessories is the special and necessary feature to all various buildings in the world and this machine system (101) can be put into the field of architecture planning as (cleaning service planning) internal and external for the buildings and the windows and implemented like the other building's features in the world such as electrical planning for a building and mechanical planning for a building. As illustrated in FIG. 1 and FIG. 2.

An automatic touchless washing machine (101) is used for all various types of internal or external building's surface wash area having different forms, such as (concave form, convex form, slant surface, angle, exterior ceiling panels and/or any other building's surface point or Window's surface point where can be attached guide railways), and for the flat surfaces wash area to a building or a window. As illustrated in FIG. 1 and FIG. 2.

The invention claimed is:

1. An automatic touchless building and window washing machine comprising:
- a guide railway system comprising:
  - one or more guide railways being fixed on a surface of a building or a window, the one or more guide railways being configured to accommodate one or more wheel sets and one or more stoppers;
    - wherein the one or more wheel sets are inserted into the one or more guide railways; and
    - wherein the one or more stoppers are attached to the one or more guide railways and the one or more wheel sets, the one or more stoppers are configured to limit motion of the one or more wheel sets;
  - a belt position column coupled with the one or more guide railways, the belt position column comprising:
    - one or two motor gearboxes each comprising a pulley;
    - a belt or a steel wire rope connecting to the one or two motor gearboxes;
    - wherein the one or two motor gearboxes are configured to facilitate movement of the belt or the steel wire rope;
    - wherein the belt or the steel wire rope is joined with the one or more wheel sets through a belt connector; and
    - one or two adjustable screws configured to adjust tension of the belt or the steel wire rope;
  - a removable tray cable and pipe coupled with the one or more guide railways and the belt position column; and
  - a railway decoration end cover is fixed on a front surface of the guide railway system;
- a carriage system comprising:
  - a carriage;
  - a wiper comprising:
    - a wiper belt positioned in a middle of the single carriage; and
    - a screw timing adjusting the wiper with the single carriage; and
  - a slide carriage comprising:
    - two or more carriages configured to be connected by end carriage plate connectors and carriage wheel plate connectors so as to increase a length of the slide carriage; and
    - a middle slide carriage connector mounted via an L-plate connector;
- three or more spray arms comprising a liquid spray arm, a water spray arm, and an air compressor arm;
- one or more sensors attached to the single carriage;
- a limit speed governor installed at an upper point of the building or the window;
- a channel collector connected to a bottom of the building or the window;
- a storage source system comprising:
  - three storage tanks of liquid, water, and air; and
- a main PLC board being installed in an interior part of the building.

2. The automatic touchless building and window washing machine as in claim 1, wherein the removable tray cable and pipe is bolted with the one or more guide railways.

3. The automatic touchless building and window washing machine as in claim 1, wherein the guide railway system is fixed on the surface of the building or the window by bolts or bolted clips.

4. The automatic touchless building and window washing machine as in claim 1, wherein the guide railway system is fixed on the surface of the building or the window which by a railway connector and a balance bracket connector; and wherein the one or more guide railways comprises a first guide railway; and a second guide railway connected to the first guide railway so as to increase a length of the guide railway system.

5. The automatic touchless building and window washing machine as in claim 1, wherein the carriage system is fixed on the one or more wheel sets through connectors.

6. A washing system comprising:

one or more guide railways being fixed on a surface of a building or a window;

one or more wheel sets inserted into the one or more guide railways;

a belt position column coupled with the one or more guide railways, the belt position column comprising:

one or two motor gearboxes each comprising a pulley;

a belt or a steel wire rope connecting to the one or two motor gearboxes;

wherein the one or two motor gearboxes are configured to facilitate movement of the belt or the steel wire rope;

wherein the belt or the steel wire rope is joined with the one or more wheel sets through a belt connector; and one or two adjustable screws configured to adjust tension of the belt or the steel wire rope;

a carriage system comprising:

a slide carriage comprising:

two or more carriages configured to be connected by end carriage plate connectors and carriage wheel plate connectors so as to increase a length of the slide carriage; and a middle slide carriage connector mounted via an L-plate connector;

three or more spray arms comprising a liquid spray arm, a water spray arm, and an air compressor arm;

one or more sensors attached to the carriage system;

a channel collector connected to a bottom of the building or the window; and a storage source system comprising:

three storage tanks.

7. A washing system comprising:

one or more guide railways comprising:

a first guide railway extending along a longitudinal direction of the first guide railway;

one or more wheels coupled to the one or more guide railways, the one or more wheels comprising:

a first wheel comprising:

a center to translate along the longitudinal direction of the first guide railway;

a carriage system connected to the one or more wheels;

three or more spray arms mounted on the carriage system; and three or more storage tanks connected to the three or more spray arms.

8. The washing system of claim 7, wherein the carriage system comprises:

an extensible slide carriage.

9. The washing system of claim 8, wherein a length of the extensible slide carriage is increased when two or more carriages are connected by end carriage plate connectors and carriage wheel plate connectors.

10. The washing system of claim 8, wherein the extensible slide carriage comprises a middle slide carriage connector mounted via an L-plate connector.

11. The washing system of claim 7, wherein the three or more spray arms comprise:

a first spray arm configured to spray liquid;

a second spray arm configured to spray water; and a third spray arm configured to spray compressed air.

12. The washing system of claim 7, wherein the three or more storage tanks comprise:

a first storage tank containing liquid;

a second storage tank containing water; and a third storage tank containing compressed air.

13. The washing system of claim 7 further comprising:

a plurality of motors;

a plurality of sensors; and a control board controlling the plurality of motors and the plurality of sensors.

14. The washing system of claim 7 further comprising:

a wiper to translate along the longitudinal direction of the first guide railway.

15. The washing system of claim 7 further comprising:

a limit speed governor installed at an upper point of a building or a window, the limit speed governor limiting a speed of the carriage system below a predetermined speed threshold.

16. The washing system of claim 7 further comprising:

a parking trench at a top or a bottom of a building, the parking trench being configured to provide a space for parking of the carriage system.

17. The washing system of claim 7 further comprising:

a channel collector connected to a bottom of a building, the channel collector collecting water and discharging the water.

18. The washing system of claim 7 further comprising:

a railway decoration end cover attached to the one or more guide railways.

19. The washing system of claim 18 still further comprising:

a carriage decoration end cover attached to the carriage system.

20. The washing system of claim 7, wherein a width of a surface of a washing area of a building or a window is smaller than or equal to a width of a single carriage of the carriage system.

21. The washing system of claim 7, a number of columns formed by the one or more guide railways increases when a horizontal dimension of a building or a window increases.

22. The washing system of claim 7, wherein the one or more guide railways further comprises a vertical guide railway; and another vertical guide railway connected to the vertical guide railway so as to increase a length of a guide railway system containing the one or more guide railways.

23. The washing system of claim 7, wherein the carriage system comprises a plurality of carriages; and wherein a number of the plurality of carriages increases when a horizontal dimension of a building or a window increases.

* * * * *